United States Patent [19]
Pedersen

[11] 3,894,558
[45] July 15, 1975

[54] ROTARY SEAL

[76] Inventor: James Miller Pedersen, 3809 Puget Dr., Vancouver 8, British Columbia, Canada

[22] Filed: May 1, 1973

[21] Appl. No.: 356,157

[52] U.S. Cl. ............................................. 137/580
[51] Int. Cl. ........................................... F16l 27/00
[58] Field of Search .......... 137/257, 258, 580, 581, 137/355.19; 416/157; 91/48 A, 485

[56] References Cited
UNITED STATES PATENTS

| | | | |
|---|---|---|---|
| 2,242,184 | 5/1941 | Reuter | 137/580 |
| 2,310,309 | 2/1943 | Orr | 137/580 |
| 2,798,506 | 7/1957 | Baker et al. | 137/580 |
| 3,620,253 | 11/1971 | Walker | 137/580 |
| 3,690,788 | 9/1972 | Pedersen | 416/157 |

FOREIGN PATENTS OR APPLICATIONS

| | | | |
|---|---|---|---|
| 1,107,468 | 5/1961 | Germany | 137/580 |

Primary Examiner—William R. Cline
Attorney, Agent, or Firm—Carver and Company

[57] ABSTRACT

Rotary seal for transmitting fluid under pressure from stationary member to rotating shaft. Shaft sleeve secured concentrically to shaft has input bores, inner ends of which are connected to annular manifold. Outer end of bores are disposed on sealing track which is surface of revolution centered on shaft. Bores have valves which open under pressure to pass fluid inwards to annular manifold. Manifold member has manifold recess defined by peripheral walls, outer edge faces of walls being complementary to sealing track. Manifold member receives fluid under pressure and moves inwards towards shaft so that peripheral walls engage shaft sleeve, and manifold recess comes into register with input bores. Valves open when in register with manifold recess and pass fluid inwards and close when out of register. Resilient means cooperating with manifold member forces peripheral walls out of contact when flow of fluid is stopped, thus reducing wear.

17 Claims, 12 Drawing Figures

SHEET 3

ROTARY SEAL

BACKGROUND OF THE INVENTION

1. Field of the Invention

The invention relates to a rotary seal in which pressurized fluid is passed from a stationary member into a rotating shaft, the seal being particularly adapted for, but not limited to, use on marine vessel tail shafts using hydraulically-operated controllable pitch propellers.

2. Prior Art

There are many types of rotary seals, some of which are used to transmit hydraulic fluid to and from rotating tail shafts of marine vessels using controllable pitch propellers. Commonly such seals shown an undesirable loss of hydraulic fluid when transmitting fluid under high pressure. When the shaft is rotated at relatively high speeds flexible seals cooperating with the moving shaft tend to wear excessively, thus contamination or loss of the fluid results. Some rotary seals have narrow passages and manifolds which absorb much hydraulic power, resulting in excessive heating of the fluid. Sometimes the rotary seals are limited to relatively low rpm because at high rpm fluid transfer is intermittent. Typical upper limits for continuous operation of known rotary seals on tail shafts are about 300 psi at 500 rpm on a 10 inch tailshaft. Also replacement of worn parts necessitates removal from the shaft of an oil distribution box of the seal, which removal usually requires drydocking of the vessel.

SUMMARY OF THE INVENTION

The invention reduces difficulties of the prior art by providing a rotary seal in which fluid power losses are reduced considerably from prior art rotary seals. Also wear of seals is considerably reduced providing a relatively long life between overhauls, which overhauls are simplified by permitting replacement of worn parts without removal of the oil distribution box from the tailshaft. Also the rotary seal is adaptable for fitting on a wide range of shaft diameters, and functions satisfactorily over a wide range of shaft rpm at pressures far in excess of normal pressures.

A rotary seal according to the invention has a shaft sleeve adapted to be secured relative to the shaft, the sleeve having a sealing track extending therearound, the track being a surface of revolution centred on the shaft. The sleeve has a plurality of input bores, the bores having outer ends disposed on the sealing track and inner ends communicating with fluid output from the sleeve. A valve is provided in each input bore, which valve when opened passes fluid into the bore and when closed restricts reverse flow through the valve. A housing is secured to the stationary member and encloses the sleeve, the housing having an interior communicating with a sump. A manifold member within the housing has a manifold recess defined by peripheral walls having rigid outer edge faces or lips complementary to the sealing track of the shaft sleeve, and has an input port to receive fluid under pressure. The manifold member is restricted against rotation with the shaft and is adapted for limited movement relative to the stationary member so that the lips of the peripheral walls engage the sealing track to bring the manifold recess into register with an input bore of the sleeve. A fluid actuated extensible means is exposed to fluid under pressure in the manifold recess and cooperates with the manifold member to urge the manifold member into contact with the sealing track as above force on the manifold member generated by the extensible means is greater than force generated by fluid pressure in the manifold recess so that when the extensible means is extended an essentially fluid tight seal is effected between the lips and sealing track. When the recess is in register with a bore, fluid under pressure in the recess opens a valve in the bore admitting fluid into the input bore.

A detail disclosure following related to drawings discloses several embodiments of the invention, which are capable of expression in structure other than that particularly described and illustrated.

DETAIL DISCLOSURE

Figure 1:
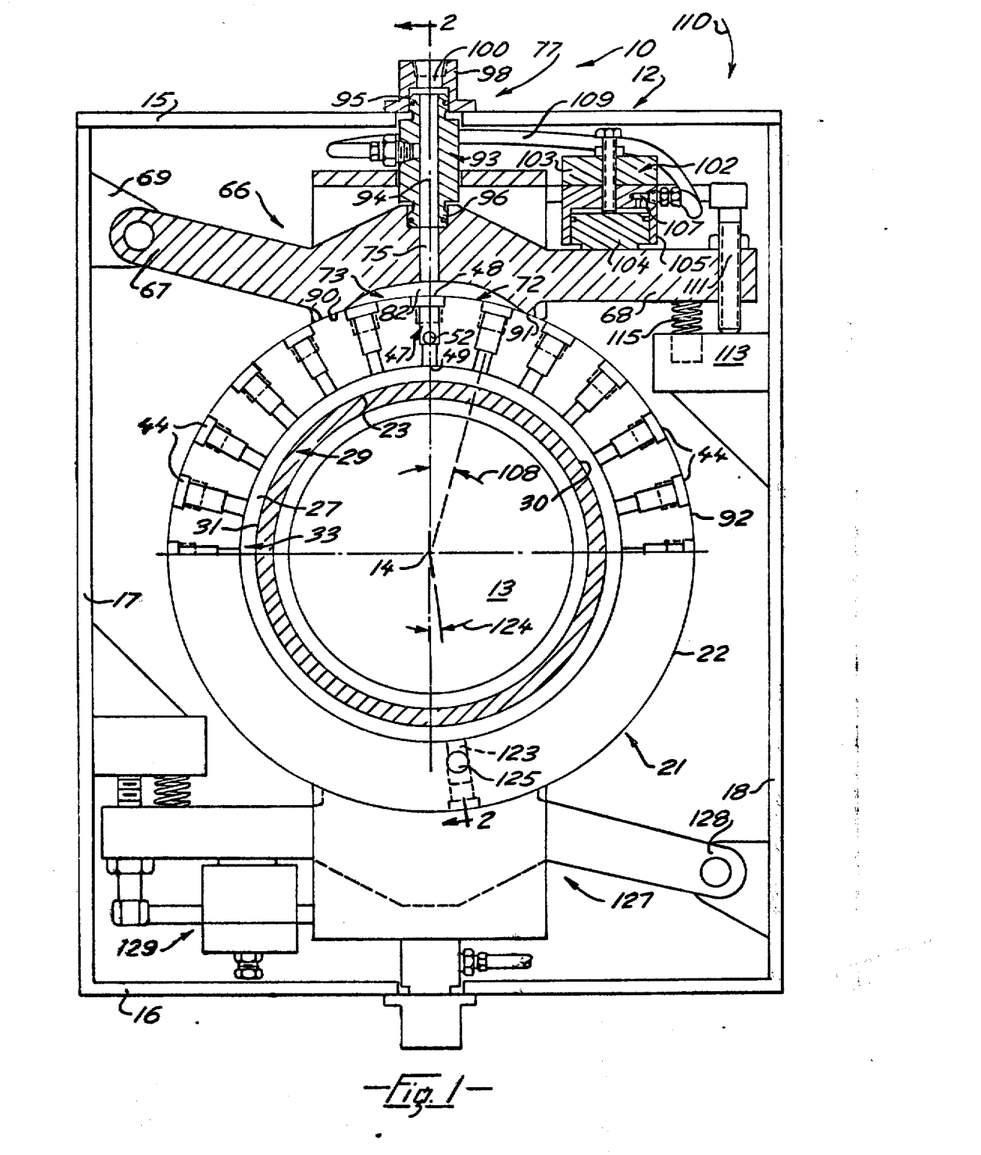
FIG. 1 is a simplified section in a transverse plane of a first embodiment of a rotary seal assembly as seen from 1—1 of FIG. 2, the sectional plane being within portions of diametrical planes of a shaft.
Figure 2:
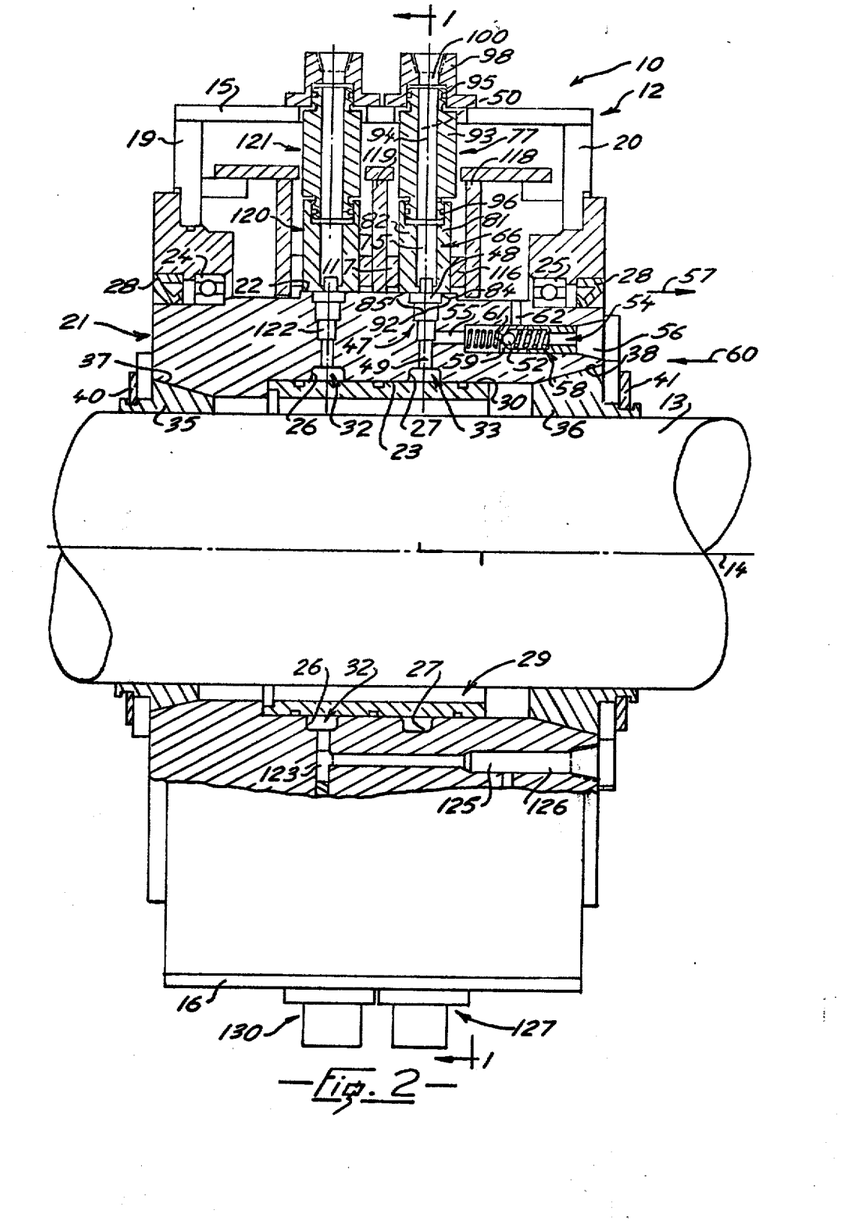
FIG. 2 is a simplified fragmented section on 2—2 of FIG. 1, some portions being omitted.
Figures 3, 4, 5, 6, 7, 10:
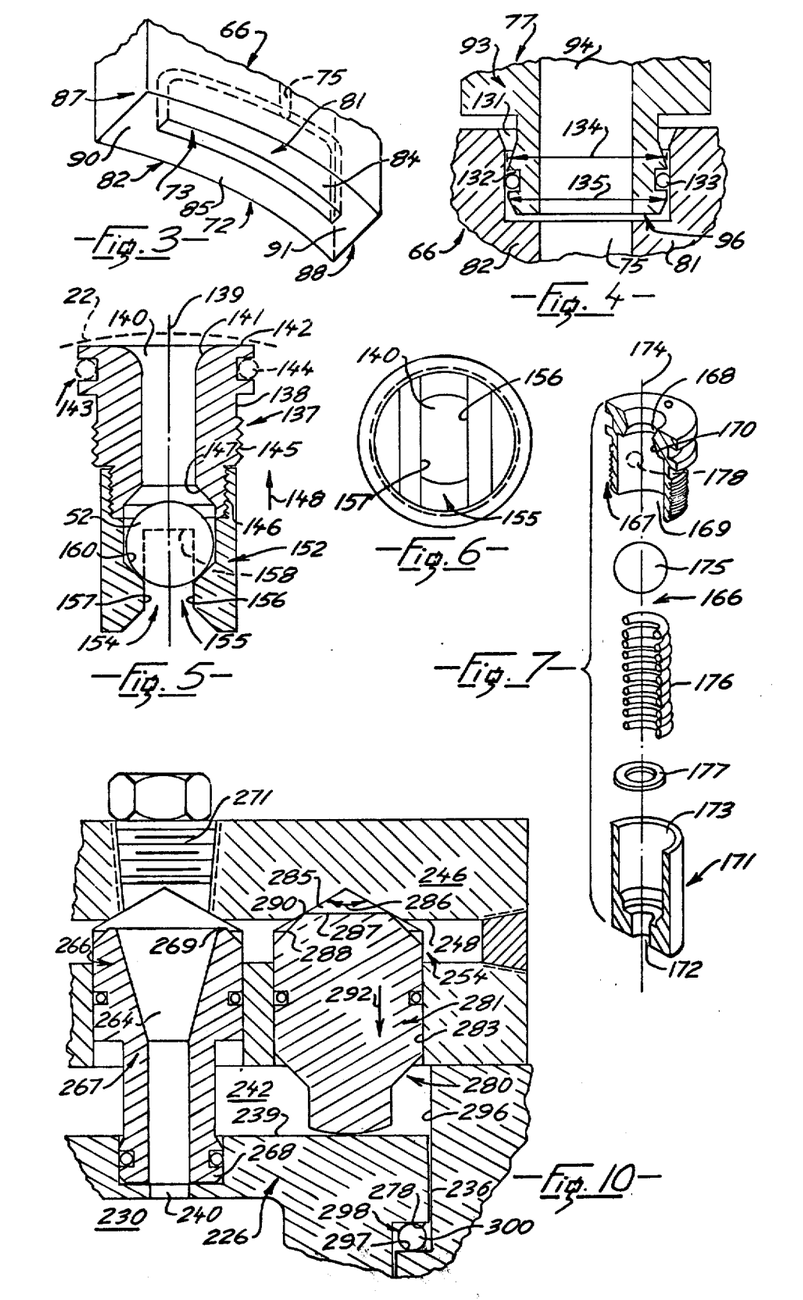
FIG. 3 is a fragmented perspective of a portion of a manifold member.
FIG. 4 is a fragmented detail section at a manifold input port.
FIG. 5 is an axial section on a valve used in the seal according to the invention.
FIG. 6 is a simplified bottom plan of the valve of FIG. 5.
FIG. 7 is an exploded perspective of an alternative valve, some portions shown in section.
FIG. 10 is a fragmented detail section of a portion of the FIG. 8 embodiment and appears on sheet 3 of the drawings.

FIGS. 1, 2 and 3

Referring to FIGS. 1 and 2, the rotary seal 10 according to the invention includes an oil distribution box or housing 12, the box enclosing a portion of a shaft 13 which rotates about a longitudinal axis 14. The box has an interior communicating with a sump (not shown) and is secured to stationary supports (not shown) and thus is also stationary and hereinafter can be referred to as a stationary member, that is it remains stationary relative to the rotating shaft. The box 12 has top and bottom walls 15 and 16, side walls 17 and 18, and end walls 19 and 20 as shown.

A shaft sleeve 21 is adapted to be secured relative to the shaft, and has an outer cylindrical surface 22 concentric with the shaft and has a central bore having an inner cylindrical surface 23. The end walls 19 and 20 of the box 12 are within spaced diametrical planes of the shaft, which planes are generally coincident with planes of spaced ends of the shaft sleeve.

Radial bearings 24 and 25 are provided between the end walls 19 and 20 and the ends of the sleeve so as to journal the stationary member on the shaft to permit true relative rotation to maintain concentricity between the shaft and the stationary member. Low pressure seals 28 spaced outboard of the bearings restrict loss of fluid from between the sleeve and box and reduce contamination. The inner surface 23 has a pair of spaced annular grooves 26 and 27 extending therearound. A sealing sleeve 29 is a snug fit within the central bore of the sleeve 21, and has an outer surface 30 in intimate contact with the surface 23, portions of the surface 30 in combination with the grooves 26 and 27 defining two annular manifolds 32 and 33 respectively extending circumferentially around the sleeve.

The sleeve 21 is secured to the shaft 13 by spaced collets 35 and 36, the collets being split permitting fitting over the shaft, outer faces 37 and 38 of the collets being conical and therefore adjustable to accommodate a range of sizes of sleeves. Retaining rings 40 and 41 are used to retain the collets together, the sleeve being secured to the shaft by interference between the collets, the shaft and the sleeve. Other means of securing the sleeve 21 to the shaft are known but the collets as above provide a simple means to accommodate a particular sleeve to shafts of different diameters by selecting collets of suitable internal diameter.

The sleeve 21 has an input bore 47, a radial bore extending radially outwards of the shaft sleeve and having an outer end 48 disposed within a diametrical plane 50 of the shaft, an inner end 49 thereof communicating with the manifold 33. A valve, a ball 52 of which only is shown, is provided in the input bore, the valve being adapted to open to pass fluid onto the bore to the annular manifold, and to close against reverse flow of the fluid from the bore. The bore 47 is one of a plurality 44 of similar input bores spaced equally within the diametrical plane of the shaft, the bores within the particular diametrical plane being referred to as a set of input bores, each bore having a respective valve.

Thus the shaft sleeve 21 has the plurality of input bores 44, the bores extending radially inwards from the outer surface 22 and having outer ends disposed within the diametrical plane of the shaft, as seen in FIG. 1.

An axial delivery bore 54 has an inner end 55 communicating with the bore 47 and an outer end 56 communicating with axial conduits (not shown) secured to and extending along the shaft to a hydraulic apparatus. Fluid from the manifold 33 is transmitted through the conduits in direction of an arrow 57 as will be described, the conduits also returning scavenged fluid in direction of an arrow 60. A scavenge valve 58 is provided in the delivery bore 54 for scavenged fluid returning along the axial conduit, the valve 58 preventing scavenged fluid from entering the input bores, and to relieve a hydraulic lock that might develop at the hydraulic apparatus. A return bore 62 is provided in the sleeve and extends from the delivery bore 54 to the interior of the housing. The valve 58 has a valve body 59 having a valve orifice 61, the valve body being slidable within the delivery bore so as to open and close the return bore 62, the bore 62 being shown closed in FIG. 2. When the valve orifice 61 is opened by fluid pressure in the input bores and the annular manifold 33, the return bore 62 is closed and the fluid passes the valve to the axial conduit in the direction of the arrow 57. When the valve orifice is closed by fluid pressure from scavenged oil returning to the sleeve in the direction of the arrow 60, the valve body moves inwards so as to open the return bore 62 to pass scavenged fluid to the interior of the housing thence to the sump. One delivery bore only is required for the annular manifold 33. The valve 58 and bore 62 are required only for return of scavenged fluid. If fluid is not returned to the sleeve, the valve 58 and bore 62 can be omitted.

A manifold member 66 is provided within the housing and has an elongated arm having first and second ends 67 and 68, the first end being hinged to a portion 69 of the box 12. The member 66 has an inner face 72 having a manifold recess 73, which recess has an input port 75 to receive fluid under pressure from a delivery means 77.

With reference to FIG. 3 the manifold recess 73 is defined in part by four peripheral walls, including a pair of spaced radial walls 81 and 82 disposed in generally parallel planes straddling the diametrical plane containing the input bores 44. The walls 81 and 82 have concave outer edge faces or lips 84 and 85 having radii substantially equal to radius of the outer surface 22 of the shaft sleeve. The peripheral walls also include a pair of spaced axial walls 87 and 88 which extend between and intersect the radial walls, the axial walls having outer edge faces or lips 90 and 91 respectively. The faces 90 and 91 are concave when viewed axially and are generally coplanar with portions of the outer edge faces 84 and 85 at intersections of the walls. Thus the outer edge faces or lips of the four peripheral walls are complementary to the cylindrical outer surface 22 of the shaft sleeve to produce an effective seal when the outer edge faces are forced against the sleeve, the lips being essentially rigid, thus contrasting with many prior art seals. The hinge of the first end 67 can be provided with an eccentric mounting or other means to permit small longitudinal movement of the arm to effect optimum engagement with the sleeve. A portion of the surface 22 swept by the outer edge faces when the shaft rotates is designated 92 in FIG. 2 and is termed "sealing track" and extends around the sleeve as can be seen. The sealing track is a surface of revolution centred on the shaft axis.

The delivery means 77 is a short tube 93 having a bore 94, and spaced ends 95 and 96, which ends have partially spherical end pieces provided with O-rings as further described with reference to FIG. 4. The end 96 is accepted in a bore of the manifold member, communicating with the input port 75, thus connecting the bore 94 to the manifold recess. A conduit connector 98 has a bore 100 and an inner recess accepting the end 95, thus the bore 94 forms a passage leading from a high pressure input conduit (not shown) secured to the connector 98 to the input port 75 of the manifold recess.

An extensible and retractable hydraulic jack 102 extends between the manifold member and a jack support plate 103 secured to the housing 12, so that extension of the jack urges the manifold member towards the sleeve. The jack has a piston 104 secured to the end 68 of the member 66 and a cylinder 105, the cylinder being secured to the plate 103 which is secured to the box 12. A cylinder input port 107 receives high pressure fluid from a conduit 109, the conduit communicating with the bore 94 of the delivery means 77. Thus fluid pressure fed into the bore 94 is fed substantially simultaneously into the jack 102, the jack cooperating with the manifold member to apply to the manifold member a turning moment in a direction about the hinged first end 67, the direction being shown by an arrow 110.

Thus the jack is a fluid actuated extensible means co-operating with the manifold member to urge the manifold member into contact with the sleeve so that outer edge faces of the peripheral walls of the manifold recess engage the shaft sleeve. The recess is thus brought into register with one or more input bores in the sleeve, and as seen in FIG. 1, at any given time a maximum number of three bores is engaged. The number of bores is dependent on diameter of the shaft and shaft rpm, e.g. surface speed of the sealing track. The manifold recess extends over an arc of the shaft sleeve, which arc in this instance is somewhat greater than twice angular pitch of the input bores, angular pitch being defined as angular separation between adjacent input bores as shown by angle 108, FIG. 1. The angle of the arc subtended by the manifold recess is dependent on the number of input bores to be covered at any particular time and the surface speed of the sealing track, an upper limit of about 150° being usual. Force from fluid in the manifold recess applies a turning moment to the manifold member in a direction opposite to the arrow 110.

Each turning moment above is a product of a resultant force from hydraulic fluid acting on an area and normal distance of that force from the hinge. For simplicity the area on which the fluid acts is reduced to an effective projected area, and force from that area is resolved into a resultant force. As fluid pressure in the manifold recess equals fluid pressure in the jack, effective projected areas and moment arms about the hinged end of the jack and the manifold recess are selected so that the turning moment from the jack exceeds the turning moment from the fluid in the manifold recess. Note that in calculation of projected effective area of the manifold recess, some allowance should be made for area of the outer edge faces of the peripheral walls. Selection as above ensures that, at all times when the jack and recess are subjected to high pressure fluid, peripheral walls of the manifold recess are in engagement with the sealing track 92 on the outer cylindrical surface 22 of the sleevve 21 to effect an essentially fluid tight seal between the lips and the sealing track. The fluid under pressure in the manifold recess opens valves of the bores in register with the recess thus admitting fluid into the input bores and thence into the annular manifold as will be described.

The second end 68 of the manifold member has an adjustable stop means including a bolt 111 and an anvil 113 secured to the sidewall 18. An end of the bolt 111 contacts an upper surface of the anvil to limit movement of the manifold member when assembling the rotary seal, but in normal operation the bolt is clear of the anvil. A compression spring 115 extends between the manifold member and the anvil to separate the peripheral walls of the recess from the sealing track of the sleeve when flow of fluid to the manifold member is stopped.

The compression spring 115 is a resilient means cooperating with the manifold member to apply a force to the manifold member in opposition to the jack 102. Thus, when the high pressure fluid to the jack is cut, the jack is de-activated and the resilient means extends to retract the jack to move the outer face edges of the peripheral walls out of contact with the shaft sleeve. This reduces wear of the peripheral walls and the shaft sleeve, the wear being further reduced by selection of materials, for example the surface 22 can be hard chrome plated and the peripheral walls can be made from an aluminum bronze. When the fluid is fed to the jack, the jack is activated and extends and compresses the resilient means, which then retracts to permit the outer face edges of the peripheral walls to contact the shaft sleeve to effect sealing, thus reducing loss of fluid from the manifold recess. Thus spring rate of the spring 115 is selected to permit the spring to retract and extend as above, total movement of the walls being a few thousandths of an inch only, sufficient to accommodate eccentricity of the sealing track of the shaft sleeve. Force from the spring 115 is generally negligible when computing turning moments as above.

A pair of guides 116 and 117 serving as wear pads extend inwards from spaced guide supports 118 and 119 and are positioned in close proximity to outer surfaces of the radial walls 81 and 82 of the manifold member 66. The guides serve as guide means and cooperate with the manifold member to restrict motion of the manifold member to substantially radial motion relative to the shaft, thus essentially preventing the manifold member from moving laterally off the sealing track and thus out of register with the input bores.

The manifold member 66 and associated set of input bores 44 and annular manifold 33 are one circuit to admit fluid under pressure from the stationary member to the shaft. This is sufficient for some applications where fluid is fed to one conduit only secured to the shaft, which conduit serves as a fluid output from the sleeve. For a controllable pitch propeller, fluid is usually required to be fed to opposite sides of a piston connected to pitch changing mechanism within a propeller hub (not shown). This requires two such circuits, a second circuit having a second manifild member 120, a second delivery means 121 and a second set of input bores disposed on a second sealing track, one input bore 122 only being shown, the second set of bores communicating with the annular manifold 32. The second manifold member, delivery means, and set of bores are generally similar to corresponding parts associated with the first manifold member. The second set of input bores has an angular pitch equal to the angular pitch of the first set 44, the valves of one set being aligned with valves of the other set when viewed along the shaft axis 14. That is the sets of input bores and valves are in phase or disposed in aligned axial relationship relative to the shaft.

A radial bore 123 extends from the manifold 32 of the second set, which bore is spaced equally between two adjacent input bores (not shown) at half angular pitch, i.e. is spaced at an angle 124 from an input bore opposite to the bore 47, see FIG. 1, the angle 124 being half the angle 108. The bore 123 communicates with an axial delivery bore 125, which communicates with the second conduit (not shown) connected to the controllable pitch propeller. With such an arrangement the axial delivery bore 125 running from the manifold 32 is staggered between a pair of bores of the first set 44 so as not to interfere with the bores of that set, thus maintaining two separate fluid circuits without interference between bores of one set and the axial delivery bore of the other set. Other means to avoid interference between the two circuits can be provided, a second means equivalent to this means being described with reference to FIGS. 8 and 9. The bore 125 has a scavenge return valve 126 (not shown in detail), similar to the valve 58, which also dumps scavenged fluid into the housing. Thus, the rotary seal having two manifold members can distribute fluid to two separate passages within a shaft sleeve, and has particular application for use with a controllable pitch propeller having pitch changing mechanism as disclosed in my U.S. Pat. No. 3,690,788 issued 12 Sept. 1972. In such an arrangement, one circuit is used for delivery of high pressure fluid, the remaining circuit simultaneously used for scavenging fluid, which is fed to the housing and returned to the sump.

Such an arrangement as above is satisfactory for many applications, however, when subjected to high pressure fluid during pitch change the manifold member exerts a radial force on the shaft sleeve. This radial force is usually resisted by the radial bearings 24 and 25, but if required the force can be substantially balanced by providing an opposed manifold member 127 as shown in FIG. 1. The opposed manifold member is generally similar to the first manifold member 66, but is disposed on a side of the shaft 13 diametrically opposite to the first member 66. The manifold member 127 is hinged about an inner end 128 and has an opposed extensible means 129 generally similar to the first extensible means. The opposed extensible means cooperates with the opposed manifold member so as to move the manifold member relative to the stationary member, which movement is within the diametrical plane containing the input bores and is opposite to movement of the first manifold member. Thus extension of both extension means urges both manifold members onto the same sealing track of the sleeve, forces from each manifold member being generally equal thus being balanced about the shaft. A similar opposed manifold member generally 130 is provided for the second manifold member 120 as shown in FIG. 2. Thus four substantially identical manifold members cooperate with a corresponding pair of sealing tracks of the sleeve supplying fluid to two separate hydraulic circuits, each circuit having a separate scavenge line returning scavenged fluid to the box 12.

When used with a controllable pitch propeller as above a common scavenge line from the hub can be used to return fluid into the oil distribution box 12, thus dispensing with one scavenge line. Leakage from the box 12 of low pressure fluid i.e. a scavenged fluid is substantially prevented by the low pressure seals 28 placed outboard of the bearings 24 and 25. A scavenge line (not shown) extends from the oil distribution box 12 to the sump (not shown), scavenge being effected by a pump section if required. In some applications to bleed air from the circuit, the housing 12 can be pressurized with fluid, so as to eliminate all air. In such cases the seals 28 are selected to withstand such pressurization, which can be relatively low e.g. about 5 psi.

FIG. 4

The end 96 of the short tube 93 is accepted in a bore 131 of the manifold member 66, which bore communicates with the manifold input port 75. As previously stated, the end 96 is partially spherical and has a circumferential groove 132 accepting an O-ring 133, the groove dividing the end 96 into two portions having maximum diameters adjacent the groove, namely an inner portion having an inner diameter 134 and an outer portion having an outer diameter 135. Width of land of the inner portion is considerably less than width of land of the outer portion. The diameter 134 is greater than the diameter 135 by an amount of about 0.015 – 0.020 inches, the inner diameter being about 0.002 inches less than diameter of the bore 131 for a tube of about one inch diameter.

A difference in diameters and land widths as above permits the tube 93 to swivel slightly to accommodate small sideways and radial movements of the manifold member that occur when the manifold member moves relative to the shaft and also provides greater tolerance in assembly. The end 95 is similar to the end 96 and this facilitates assembly of the connector 98. As the tube 93 is thus effectively mounted at two positions spaced from the ends, other factors being equal, the tube can swivel over a wider arc than if it were mounted at the extreme points adjacent the two ends.

FIGS. 5 and 6

The valve fitted in the bore 47 is designated 137, and is closed by the ball 52 as will be described. The valve has a cylindrical body 138, a central axis 139 and a central bore 140, the bore having a bell mouth end 141 as shown. The bell mouth end extends smoothly from an outer end face 142 of the body, which face is generally recessed a small distance e.g. about 0.010 inches below the outer cylindrical surface 22 of the shaft sleeve, shown in broken outline. Recessing the face as above reduces wear on the valve and peripheral walls of the manifold recess. An annular recess 143 extends around the body adjacent the outer end face 142 and accepts an O-ring 144 (broken outline) to seal the valve within the bore 47. The valve is threaded into the bore 47 by threads 145, means (not shown) in the end face 142 being provided for applying torque to the valve. The body 138 has a threaded inner end 146, and a truncated conical valve seat 147 adjacent the inner end. When the valve is closed the ball 52 is forced against the valve seat 147, thus closing the valve to reverse flow of fluid in direction of an arrow 148, that is radially outwards relative to the shaft 13 of FIGS. 1 and 2.

A valve inner portion 152 has a bore 154 aligned with the bore 140 and a transverse slot 155 extending diametrically across the bore and the inner portion. The slot is defined in part by opposed parallel sidewalls 156 and 157, and an end wall 158 (broken outline). The inner portion 152 has a pair of partial conical faces 160 extending around the bore 154 and facing the valve seat 147, spacing between the seats and the faces 160 being greater than the diameter of the ball so as to permit the ball to have limited axial movement between the face 160 and the seat 147. When the ball 52 rests against the face 160 as shown fluid can flow past the ball and between the walls 156 and 157 of the slot 155. Cross-sectional area of slot is selected so that flow through the valve in a forward direction opposite to the arrow 148 (i.e. radially inwards) is scarcely reduced by the ball. The ball is moved to the position as shown in FIG. 5, that is the open position, when the input bore having the valve comes into register with the manifold recess and fluid pressure forces the ball against the face 160. When the ball is clear of the manifold recess rotation of the shaft produces centrifugal force on the ball which forces the ball 52 against the seat 147, thus closing the valve.

OPERATION

In a non-activated condition when the shaft is stationary or rotating the outer edge faces of the walls 81, 82, 87 and 88 are held clear of the sealing track of the surface 22 of the sleeve by the spring 115. When fluid is to be passed into the sleeve, pressurized hydraulic fluid from a hydraulic fluid power pack (not shown) is delivered to the bore 100 of the conduit connector 98, which fluid passes to the manifold recess 73. Pressurized fluid also passes through the conduit 109 to activate the jack 102, the piston 104 of which extends and forces the manifold member radially inwards, compressing the spring 115 and forcing the outer edge faces of the peripheral walls of the manifold recess into engagement with the cylindrical surface 22. Fluid in the manifold recess exerts pressure on the valves which at that instant are coming into register with the manifold recess. At any particular time a maximum of three valves can be opened, which valves admit fluid in pulses through the respective input bores into the annular manifold 33 from where the fluid is distributed to the axial bore 54, and through the valve 58 to leave the rotary seal in the direction of the arrow 57. When the bores come out of register with the recess the valves close, stopping fluid from centrifuging outwards.

If two circuits using the two manifold members 66 and 120 only are coupled to the propeller, at any particular time of activation one manifold member only is urged onto the shaft, the remaining member being clear of the shaft due to extension of the spring, thus reducing wear on that member and the sleeve. If a pair of opposed manifold members are also used, i.e. the members 127 and 130, at any particular time of activation one opposed pair of the four manifold members will be activated, that is the manifold members using the same sealing track, the remaining opposed pair being deactivated and clear of the shaft.

If low pressure scavenged fluid is returned to the rotary seal, as is usual practise with controllable pitch propellers, the scavenged fluid enters the seal through the bore 154, by-passes the valve 58 thence enters the bore 62 from where it enters the box 12. Scavenged fluid can also return to the box 12 via the bore 125 and a bore (not shown) equivalent to the bore 62.

The rotary seal as described can be used to transmit fluid at high pressure, for example 5000 psi, into relatively large diameter shafts, for example 10 inches, rotating at relatively high rpm, for example 1000 rpm. With modification higher performance can be attained, two-way tranfer efficiency being as high as 95 %, e.g. 10 gallons per minute delivered to the seal and 9.5 gallons per minute scavenged from the seal.

ALTERNATIVES AND EQUIVALENTS

FIG. 7

An alternative valve 166 has a cylindrical body 167 having an outer bore 168, an inner bore 169 and a valve seat 170 disposed between the two bores. The valve has an inner portion 171 having an outer bore 172 and an inner bore 173, the portion 171 being secured to the body 167 so that the bores are aligned and concentric about an axis 174, the inner bores 169 and 173 having substantially equal diameters. A ball 175 is a loose fit in the bore 169 and is forced against the valve seat 170 by a compression spring 176 thus closing the valve. A washer 177 provides an anchor for the spring 176.

The valve 166 functions similarly to the valve 137 and differs from that valve by providing the compression spring 176 which augments closure of the valve. A spring-closed valve as above or equivalent is essential for use in an alternative rotary seal as described in FIGS. 8 and 9. If the valve is to be used in the alternative seal at least one transverse bore 178 is drilled in the body 167, the bore being shown in broken outline. The bore 178 is positioned so that, when the ball is lifted clear of the seat by fluid, the bore 178 is exposed to pass fluid. In such an arrangement the outer bore 172 is omitted and fluid passes through the valve through the transverse bore.

Figure 8:
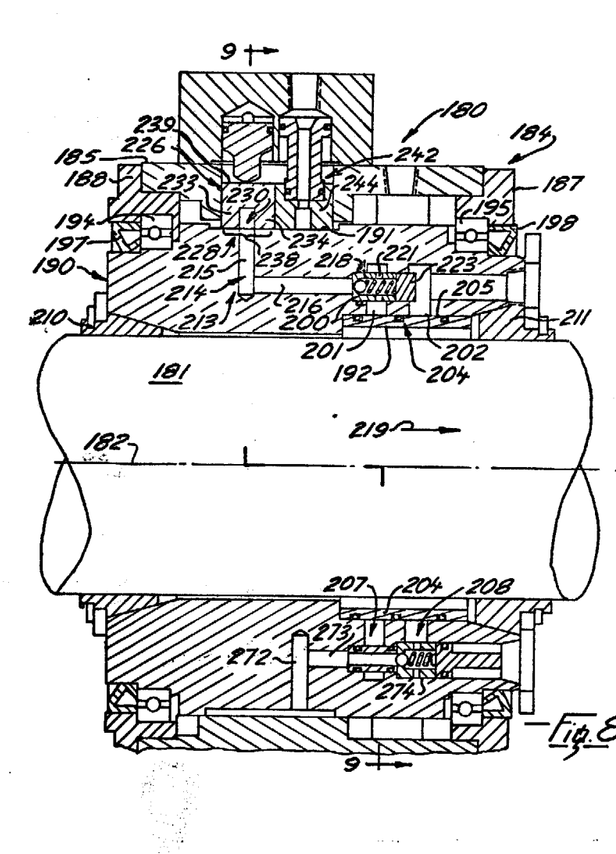
FIG. 8 is a simplified fragmented section in axial planes of an alternative rotary seal as seen from 8—8 of FIG. 9, the sectional planes containing an axis of a shaft.
Figure 9:
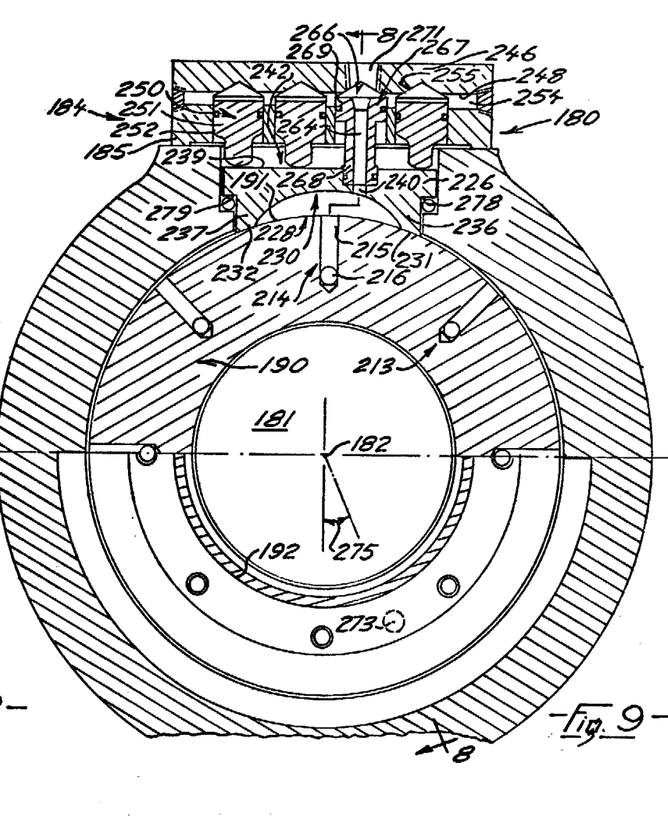
FIG. 9 is a simplified section on 9—9 of FIG. 8, some portions being omitted.

FIGS. 8 and 9

An alternative rotary seal 180 cooperates with an alternative shaft 181 having a longitudinal axis of rotation 182. The seal 180 has a housing 184 having a top wall 185, and spaced end walls 187 and 188, the housing remaining stationary relative to the shaft and being termed generally a stationary member. The rotary seal includes a shaft sleeve 190 having an outer cylindrical surface 191 concentric with the shaft, and an inner cylindrical surface 192 spaced from the shaft. Bearings 194 and 195 journal the housing 184 on the shaft sleeve, clearances between the housing and shaft sleeve being sealed by low pressure seals 197 and 198 respectively. The inner surface 192 has spaced annular grooves 201 and 202 extending therearound. A sealing sleeve 204 has an outer cylindrical surface 205 which, in combination with the annular grooves 201 and 202, defines annular manifolds 207 and 208 respectively. Collets 210 and 211 retain the shaft sleeve secure and concentric relative to the shaft similarly to the collets 35 and 36 of FIGS. 1 and 2.

The shaft sleeve has a plurality of equally spaced input bores 213 constituting a set of bores, the bores extending inwards from the outer surface and having outer ends disposed within a diametrical plane of the shaft, similarly to the input bores 44 of FIGS. 1 and 2. The shaft sleeve 190 differs from the shaft sleeve 21 in disposition relative to the sleeve of the input bores and disposition of valves provided in the bores. A typical input bore 214 has outer and inner portions, which portions are two distinct bores intersecting as shown. The outer portion is a radial bore 215 disposed within the diametrical plane of the outer end of the input bores 213, and the inner portion is an axial bore 216 and is disposed axially relative to the shaft. When high pressure fluid is fed to the bore 216 the valve is opened and fluid is passed through the valve to the manifold 207, the valve being closed to reverse flow.

The valve 218 is essentially similar to the valve 166 of FIG. 7 and has a valve body 220 similar to the body 167. A transverse passage 221 similar to the passage 178 extends through the body and the valve has a closed outer end 223 similar to the closed bore 172 of the inner portion 171. Because the valve is disposed axially a spring is required to act on a ball to effect closure. When the valve is opened, the ball is lifted off the valve seat and fluid flows into the valve body, the fluid leaving the valve body through the transverse passage 221 and entering the annular manifold 207. The annular manifold connects with a further axial delivery passage (not shown), the further passage communicating with the propeller hub, or other hydraulic component (not shown).

A manifold member 226 is a shoe having an inner face 228 having a manifold recess 230 defined by peripheral walls similarly to the walls of FIG. 3. The walls include a pair of spaced radial walls 233 and 234 disposed in generally parallel planes straddling the diametrical plane containing the radial bores 215, and spaced axial walls 236 and 237 extending between the axial walls. Similarly to the manifold member 66 of FIG. 3, the inner face contains is provided with outer edge faces or lips of the peripheral walls, two lips 231 and 232 of the walls 236 and 237 only being designated in FIG. 9. The lips are rigid and complementary to the outer surface 191 of the shaft sleeve to produce an effective seal when the edge faces contact the sleeve. A portion of the surface 191 swept by the outer edge faces of the peripheral walls is similarly termed sealing track and designated 238 in FIG. 8 and is also a surface of revolution centered on the shaft axis. The shoe has an outer face 239 and an input port 240 to receive fluid under pressure. Thus, the shoe is a generally rectangular block, having the four walls 233, 234, 236 and 237, the outer face 239 and the concave inner face 228 having the recess. The walls 236 and 237 are stepped, as will be described in more detail with reference to FIG. 10.

Similarly to the manifold member 66 of FIG. 1, the manifold member 226 is adapted for limited generally radial movement relative to the stationary member, means of effecting movement differing from the hinged arm arrangement of FIG. 1. The housing 184 has a generally rectangular-sectioned shoe recess 242 to accept the shoe 226, together with a second shoe 244 related to a similar set of bores to be described, the shoe 244 being essentially similar to the shoe 226. The recess has spaced axial walls which are stepped and complementary to the axial walls 236 and 237 of the shoe, and spaced radial walls complementary to the radial wall 233, and a similar opposite wall of the adjacent shoe 244. The axial walls of the recess are described in more detail with reference to FIG. 10 and serve as guide means cooperating with the shoe to restrict motion of the shoe to substantially radial motion relative to the shaft.

A bridge member 246 secured to the housing 184 cooperates with and is spaced outwards from the recess 242, and has an inner face 248 disposed oppositely to the outer face 239. A hydraulic jack 250 extends between the outer face 239 and the bridge member so that extension of the jack moves the shoe radially inwards to contact the sealing track of the shaft sleeve. The hydraulic jack has a piston 251 which slides within a bore 252 of the bridge member, the bore 252 serving as a portion of a cylinder and restricting the piston to substantially axial movement normal to the shoe 226. The bridge member has a plurality of undesignated bores similar and parallel to the bore 252 serving as cylinders for corresponding pistons of a plurality of jacks 255. The member 246 also has a transverse bore 254 which communicates with an upper portion of the bore 252 and the similar bores so as to admit fluid into the bores to actuate pistons of the jack 250 and the plurality of jacks 255. The pistons of the jacks 255 cooperate similarly with the shoe as shown in FIG. 9, thus there is a plurality of hydraulic jacks provided in the recess extending between the shoe and the inner face of the bridge member. Similarly to the FIG. 1 embodiment, total force from the jacks exceeds an opposite force from the fluid within the manifold recess. The bore 254 serves as a conduit to deliver hydraulic fluid to the jacks so that the jacks extend generally uniformly to urge the shoe radially onto the shaft.

Thus the plurality of hydraulic jacks serve as fluid actuated extensible means cooperating with the manifold member to urge the manifold member into contact with the sleeve, similarly to the hydraulic jack 102 of FIGS. 1 and 2.

With reference to FIG. 9 a delivery means 266 is a short tube 267 having a bore 264 and outer ends 268 and 269, which ends are similar to the ends 95 and 96 of the delivery means 77. The inner end 268 communicates with the input port 240 of the manifold recess and the outer end 269 communicates with a high pressure input port 271 coupled to a hydraulic hose (not shown). Ends of the tube are partially spherical, and thus accommodate small movements of the shoe 226.

Thus the input port 271, the delivery means 266, the shoe 226, and the set of input bores 213 provide a means of supplying fluid to the annular manifold 207, fluid from which is fed to the controllable pitch propeller or other hydraulic component through an axial delivery line (not shown). If one delivery line only is required, one set of bores and manifold member is sufficient, forming one circuit. However, for a controllable pitch propeller two high pressure circuits arer usual and thus the shoe 244 is used also and communicates with a corresponding second set of input bores, one bore only being shown in FIG. 8 and designated 272. The input bore 272 is radial and communicates with an axial bore 273 having a valve 274 equivalent to the valve 218, which valve communicates with the annular manifold 208, which in turn communicates with a further axial delivery bore, not shown. The second set of input bores is pitched equally to the first set but staggered relative to the first set. That is a bore of one set is disposed at one-half angular pitch relative to an adjacent bore of the other set, shown as an angle 275 in FIG. 9. This is a means to avoid interference between axial bores of each set and is equivalent to the disposition of the bore 125 in FIG. 1. Thus two separate circuits are required, scavenged fluid being returned similarly in FIG. 1.

Similarly to the FIG. 1 embodiment means are provided to lift the manifold member clear of the sealing track of the sleeve when fluid is not required. As previously stated, the axial walls 236 and 237 of the shoe are stepped and have shoulders 278 and 279 respectively, which shoulders are spaced from opposed corresponding shoulders provided in side walls of the recess 242 of the housing 184. The two spaced shoulders on each side of the shoe, in combination with the shoe and the housing define spaced parallel cavities to accept resilient means to be described with reference to FIG. 10. The resilient means act on the manifold member in opposition to the extensible means and are equivalent to the spring 115 of FIG. 1.

FIG. 10

The plurality of jacks 255 within the recess 242 of the housing are fed with fluid in the transverse bore 254, which bore serves as a manifold to distribute fluid essentially equally to each jack, thus ensuring substantially inwards radial movement of the shoe 226. One hydraulic jack 280 of the plurality has a piston 281 having a cylindrical outer surface slidable within a bore 283 within the bridge member 246, the bore serving as the cylinder as aforesaid. The bore has an upper end having a conical face 285, the conical face having an included angle 286 equal to the angle of a point of a drill used to produce the conical face, that is about 120°. The conical face extends beyond the transverse bore 254, that is the bore 254 enters the bore 283 at a position spaced from an upper end of the bore. The piston has an upper end face 287 having a chamfered edge 288, which edge is a truncated conical face having an included angle of about 90°, that is the truncated conical face is more acute than the conical face 285 of the bore. Thus, when the piston is retracted in the raised position as shown, an inner rim 290 of the chamfered edge contacts the conical face 285. Contact of the rim 290 as above ensures that there is clearance adjacent upper end of the piston when retracted, to permit passage of fluid to other jacks. The outer end 269 of the short tube 267 has a similar chamfer for distribution of fluid.

When fluid under pressure is fed to the port 271 some fluid enters the bore 264 and some fluid enters the bore 254. Thus fluid is fed to the manifold recess 230 and substantially simultaneously to each jack. Fluid in the bore 254 exerts a force on the piston 281 in a direction of an arrow 292, which moves the piston downwards forcing the manifold member against the shaft sleeve. Downwards movement increases clearance between the end 287 of the piston and the conical face 285. This increases flow past the top of the piston, increasing distribution of fluid to adjacent pistons, ensuring essentially inwards radial movement of the shoe.

As previously stated the shoe 226 has stepped axial walls 236 and 237 having shoulders 278 and 279. The wall 236 slides against a wall 296 of the recess, the wall having a shoulder 297 spaced from the shoulder 278, the opposed walls and shoulders defining a cavity 298. The cavity has a resilient means 300 which is suitably a length of elastomeric cylinder having a diameter somewhat greater than separation of the shoulders 278 and 297 when in an extreme separated position. Thus the means 300 and a similar means (not shown) cooperating with the wall 237 tend to force the shoe radially outwards from the sleeve and are thus equivalent to the compression spring 115 of FIGS. 1 and 2. Thus when the plurality of jacks are de-activated the resilient means extends and moves the outer face edges of the peripheral walls out of contact with the shaft sleeve, thus reducing wear of the shaft sleeve and walls. When the jacks are activated and extended, the resilient means compress to permit the outer edge faces of the peripheral walls to contact the sleeve.

Operation of the alternative seal 180 follows closely that of the seal 10 of FIG. 1 and is not discussed. One difference relates to an inefficiency of fluid transfer due to axial disposition of the valves in the input bore inner portions. When the outer end of the bore 216 comes out of register with the recess 230, the valve 218 closes, leaving a volume of fluid within the bores 215 and 216, i.e. that fluid which did not pass the valve. This fluid is centrifuged outwards into the housing and thus this valve disposition results in loss of fluid contained in the bore 215 and 216. The loss of fluid above can result in air carried in with each pulse of fluid, amount of air being greater than that carried in with the rotary seal 10 of FIG. 1. The above inefficiency can be reduced considerably by pressurizing the housing with fluid as aforesaid, thus purging air from the system.

FURTHER ALTERNATIVES

If required an opposed pair of manifold members (not shown) can be provided in the housing 184, the opposed pair being diametrically opposite to the manifold members 226 and 244, and thus balance loads on the shaft similar to the opposed pair of manifold members is shown in the FIG. 1 embodiment. This alternative is not shown.

If desired the shoes 226 and 244 can be used in combination with the shaft sleeve 21 of FIG. 1 having the sets of input bores with radially disposed valves. This arrangement would permit use of valves without springs as centrifugal force is used to close the valves. Similarly, the shaft sleeve 190 of FIG. 8 can be used with the manifold member 16 of FIG. 1. Neither of these two alternative arrangements are shown.

A further alternative described below relates to an alternative disposition of the sealing track. As previously stated the sealing track is a surface of revolution centered on the shaft axis and, as will be seen, can be any surface from a cylindrical surface to a plane annular surface, including a conical surface, the latter surface not being illustrated.

Figure 11:
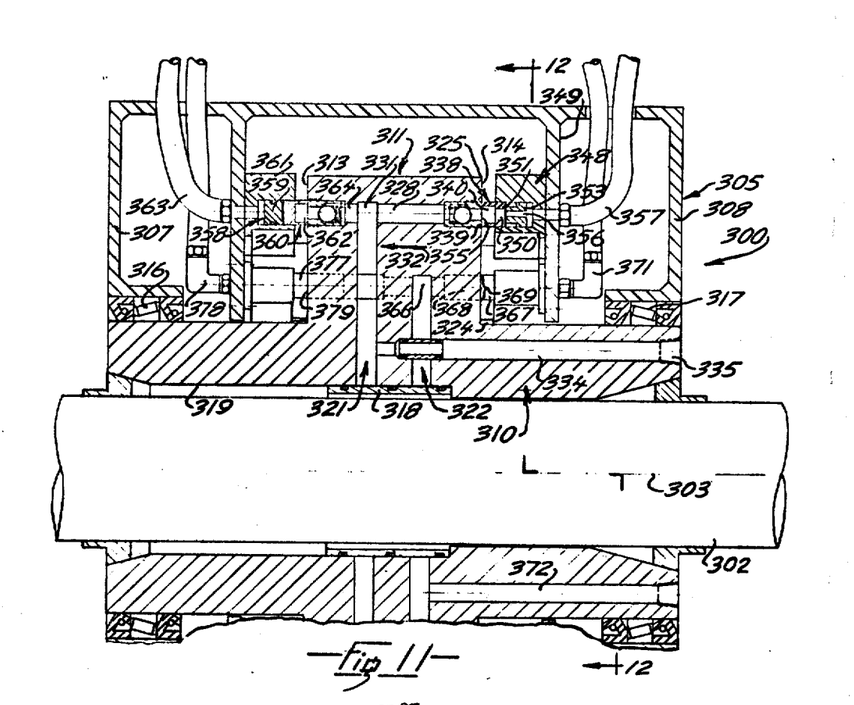
FIG. 11 is a simplified fragmented section in an axial plane of a further alternative rotary seal, as seen in part from 11—11 of FIG. 12.
Figure 12:
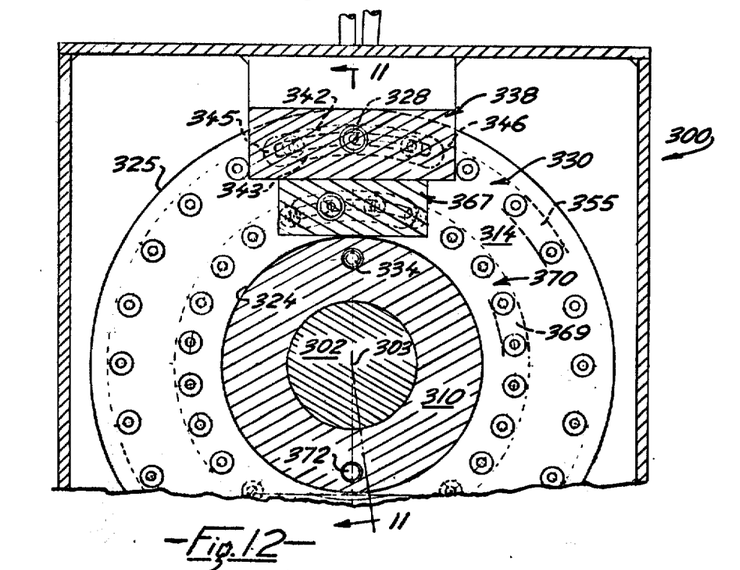
FIG. 12 is a simplified fragmented section on 12—12 of FIG. 11, some portions being omitted.

FIGS. 11 and 12

An alternative rotary seal 300 cooperates with an alternative shaft 302 having an axis of rotation 303. The seal has a housing 305 secured to a stationary member (not shown), the housing having undesignated top and bottom walls and spaced end walls 307 and 308. The seal has a shaft sleeve 310 secured to the shaft by collets, similarly to previously described seals and collets, and has an annular rim 311 extending therearound, the rim having spaced plane annular faces 313 and 314. The housing is journalled on the sleeve by bearings 316 and 317, the bearings being protected from contamination, and fluid leakage from the seal being reduced, by undesignated seals straddling the bearing. A sealing sleeve 318 is in intimate contact with an inner surface 319 of the sleeve 310, the surface 319 having two circumferential grooves 320 and 321 extending circumferentially around and radially outwards from the surface. The sleeve 318 and circumferential grooves form annular manifolds 321 and 322, which extend circumferentially around the sleeve similarly to the annular manifolds of the previously described embodiment, but penetrate deeper into the sleeve.

The annular face 314 is disposed in a diametrical plane of the shaft, and has inner and outer circumferential edges 324 and 325. An input bore 328 extends axially into the rim from the face 314 and communicates with a peripheral portion 331 of the annular manifold 321. The valve has a spring urged ball which is opened by fluid flow in direction of an arrow 332, the ball closing the valve to reverse flow. The shaft sleeve has a plurality of input bores 330 similar to the bore 328, the bores having outer ends disposed on the face 314 at an equal distance from the shaft 302, as seen in FIG. 12, and inner ends communicating with the manifold 321. An axial delivery bore 334 has an inner end communicating with the annular manifold 321, and an outer end 335 serving as a fluid output from the sleeve, being connected to axial conduits (not shown), which are connected with a hydraulic apparatus on the shaft. If scavenged fluid is to be returned to the seal a scavenge return valve (not shown) is fitted in the bore 334, similarly to the valve 58 of FIG. 1.

A manifold member 338 within the housing has an inner face 339 having a manifold recess 340 defined by spaced peripheral walls. As shown in broken outline in FIG. 12, the peripheral walls include a pair of radially spaced circumferential walls 342 and 343, and a pair of spaced connecting walls 345 and 346 extending between and intersecting the circumferential walls. The peripheral walls have undesignated coplanar outer edge faces or lips on the inner face 339, the edge faces being disposed in a diametrical plane of the shaft.

The manifold member is mounted for general axial movement relative to the shaft in a manifold member mounting 348 secured to a support 349 extending across the housing. The mounting 348 engages the manifold member and guides it so that the outer edge faces of the peripheral walls engage substantially simultaneously the annular face 314, thus serving as a guide means. The manifold member has an input port 350 in an outer face 351, the port 350 communicating with the manifold recess. A tube 353 carried in the mounting 348 has a central passage 356 which connects the input port with a high pressure conduit 357 receiving fluid under pressure thus serving as a delivery means similarly to the means 77 of FIG. 1.

Jacks, not shown in the mounting 348, force the outer edge of faces of the manifold member 338 against the annular face 314, the jacks serving as extensible means cooperating with the manifold member. The jacks are similar to the previously described jacks 250 of FIG. 9 and are briefly described below with reference to an opposed mounting. As the shaft rotates the outer edge faces of the peripheral walls sweep the face 314, defining a sealing track 355 on the face 314, the track shown partially in FIG. 12. The outer edge faces of the peripheral walls are complementary to the sealing track to produce an effective seal when the outer edge faces are forced axially against the sealing track. As can be seen, the sealing track is a surface of revolution centered on the shaft.

Thus, the conduit 357, the tube 353, the manifold member 338 and the plurality of input bores 330 communicating with the manifold 321 and the axial bore 334 form one circuit for admitting high pressure fluid into the sleeve. Arrangement as above using one manifold member only results in relatively high thrust loads on the bearings 316 and 317, which bearings would therefore be thrust bearings as shown.

A preferred arrangement uses two manifold members feeding simultaneously into the same annular manifold. In the preferred arrangement, as shown only in FIG. 11, an opposed manifold member 360 carried in an opposed mounting 361 receives high pressure fluid from an opposed high pressure conduit 363. The conduits 357 and 363 are coupled to a common supply line, so that both manifold members 338 and 360 receive pressurized fluid simultaneously. The fluid passes through a tube (not shown) similar to tube 353, which tube similarly connects to an input port (not shown) of the member 360. One jack 358 has a piston 359 slidable in the mounting 361, the piston contacting an outer face of the member 360 to urge the outer face edges against the face 313. Each mounting 348 and 361 has several jacks having pistons similar to the piston 359, which jacks are hydraulically coupled together as described in FIG. 9. The manifold member 360 feeds fluid into an opposed input bore 364 through an associated valve, the bore 364 having an inner end communicating with the annular manifold 321. The manifold member 360 engages a similar sealing track 362 provided on the annular face 313, the track having a similar plurality of bores. Thus the two annular faces 313 and 314 disposed in spaced diametrical planes have respective sealing tracks, which tracks are engaged by opposed manifold members, which operate simultaneously to feed fluid into the same annular manifold 321.

Such an arrangement substantially balances axial forces applied to the rim 311 and thus relieves thrust load on the bearings 316 and 317, size and design of which can therefore be modified to suit. The arrangement above provides one circuit only, and is equivalent to use of opposed manifold members 66 and 127 in FIG. 1.

As previously stated, most controllable pitch propellers require two separate fluid circuits and thus a separate circuit is provided to feed fluid to the annular manifold 322. A third manifold member 367, similar to but smaller than the manifold member 338, engages a sealing track 369 on the face 314. The manifold member 367 receives high pressure fluid from a high pressure conduit 371, which conduit is independent of the conduits 363 and 357. The sealing track 369 is concentric with and spaced radially inwards from the track 355 and has a plurality 370 of input bores, the bores having valves similarly to the plurality 330, one such bore 368 being shown in broken outline.

An inner end of the bore 368 communicates with an outer portion 366 of the annular manifold 322, the plurality 370 of input bores similarly communicating with the annular manifold 322. An axial bore 372, serving as a fluid output is similar and equivalent to the bore 334 and connects the annular manifold 322 to the hydraulic apparatus through axial conduits (not shown). As seen in FIG. 12 the plurality 370 of input bores is equal in number to the plurality 330 and thus the bores are pitched closer together on a smaller pitch circle. The annular manifold 367 engages three input bores, similarly to the annular manifold 338, so as to equalize volume flow of fluid fed into the input bores.

As seen in FIG. 12, both sealing tracks are provided between the inner and outer edges 324 and 325 of the face 314 and both manifold members can operate independently of each other. To balance axial force from the manifold member 367 a fourth manifold member 377 fed by high pressure conduit 378 is provided to engage the face 313 as shown. The member 377 cooperates with a sealing track 379 similar to the track 369, which has input bores (shown in broken outline) connected to the annular manifold 322 similarly to the bore 364. The high pressure conduits 378 and 371 are fed from a common source, and thus both manifold members 367 and 377 are activateed simultaneously to feed fluid simultaneously to the annular manifold 322.

If required a similar set of four manifold members (not shown) can be provided diametrically opposite to the members 338, 360, 367 and 377, thus feeding fluid into the four sealing tracks and input bores on two sides of the shaft.

I claim:
1. A rotary seal for transmitting fluid under pressure from a stationary member to a rotating shaft, the shaft having a longitudinal axis of rotation, the rotary seal including:
 a. a shaft sleeve adapted to be secured relative to the shaft, the sleeve having a sealing track extending therearound, the track being a surface of revolution centered on the shaft axis,
 b. the shaft sleeve having a plurality of input bores, the bores having outer ends disposed on the sealing track and inner ends communicating with a fluid output from the shaft sleeve,
 c. a valve provided in each input bore, the valve being adapted to open to pass fluid into the bore, and to close against a reverse flow of fluid from the bore,
 d. a housing secured to the stationary member and enclosing the sleeve,
 e. a manifold member within the housing, the member being restricted against rotation with the shaft and having an inner face having a manifold recess defined by peripheral walls having rigid lips complementary to the sealing track of the shaft sleeve, the manifold recess having an input port to receive fluid under pressure, the manifold member being mounted for limited movement relative to the stationary member to move the lips into contact with the sealing track, a first force being generated by the fluid in the manifold recess tending to lift the lips of the manifold member off the sealing track,
 f. fluid-actuated extensible means exposed to the fluid under pressure in the manifold recess and co-operating with the manifold member to generate a second force on the manifold member to urge the manifold member into contact with the sleeve when the manifold recess receives fluid under pressure, the second force exceeding the first force so that the extensible means extends and forces the lips of the peripheral wall of the manifold recess against the sealing track of the shaft sleeve to engage the sealing track and to effect an essentially fluid tight seal between the lips and the sealing track,
thus permitting the manifold recess to be brought into register with an input bore of the sleeve, so that fluid under pressure in the manifold recess opens a valve in the bore in register with the recess, thus admitting fluid into the input bore.

2. A rotary seal as claimed in claim 1 in which:
 i. the sealing track is a portion of an outer cylindrical surface of the shaft sleeve concentric with the shaft axis,
 ii. the manifold member is adapted for generally radial movement relative to the shaft, and peripheral walls defining the manifold recess of the manifold member include:
 iii. a pair of spaced radial walls disposed in generally parallel planes straddling the diametrical plane containing the input bores, the lips of the radial walls being concave and having radii substantially equal to radius of the outer surface of the shaft sleeve, the radial walls extending over an arc of at least twice angular pitch of the input bores,
 iv. a pair of spaced axial walls extending between and intersecting the radial walls, the lips of the axial walls being generally coplanar with portions of the lips of the radial walls at intersections of the walls,
so that the lips of the peripheral walls are complementary to the sealing track of the shaft sleeve to produce an effective seal when the lips are forced against the sealing track.

3. A rotary seal as claimed in claim 1 in which:
 i. the sealing track is a portion of an outer cylindrical surface of the shaft sleeve concentric with the shaft axis,
 ii. the manifold member is adapted for generally radial movement relative to the shaft, so that the lips of the manifold member are brought into contact with the sealing track.

4. A rotary seal as claimed in claim 3 in which:
 i. the manifold member has spaced first and second ends, the first end being hinged to the housing,
 ii. the housing has guide means cooperating with the manifold member to restrict motion of the manifold member to substantially radial motion relative to the shaft,
 iii. the input port of the manifold recess receives fluid from the conduit, and the first force from the fluid in the manifold recess applies a turning moment to the manifold member in a first direction,
 iv. the extensible means is a hydraulic jack receiving fluid under pressure from a conduit, the jack extending between the housing and a portion of the manifold member to apply the second force to the manifold member to generate a turning moment about the hinged first end in a second direction opposite to the first direction, so that fluid pressure in the manifold recess essentially equals fluid pressure in the jack, and effective projected areas and moment arms about the hinged first end of the jack and manifold recess are selected so that the moment from the jack exceeds the moment from the fluid in the manifold recess.

5. A rotary seal as claimed in claim 4 wherein:
 i. the second end of the manifold member has an adjustable stop means,
 ii. the stationary member has an anvil against which the stop means is swung to limit movement of the manifold member.

6. A rotary seal as claimed in claim 3 in which:
 i. the manifold member is a shoe having an inner face provided with the lips of the peripheral walls of the manifold recess, which lips are adapted to be urged into contact with the sealing track of the shaft sleeve, the shoe having an outer face remote from the inner face, the input port of the manifold recess receiving fluid under pressure from a conduit,
 ii. the housing has a shoe recess to accept the shoe, the shoe recess having guide means cooperating with the shoe to restrict motion of the shoe to substantially radial motion with respect to the shaft,
 iii. a bridge member cooperating with the housing and spaced outwards from the shoe recess,
 iv. the extensible means is a hydraulic jack extending between the outer face of the shoe and the bridge member, the jack receiving fluid under pressure from the conduit, so that fluid pressure in the manifold recess essentially equals fluid pressure in the jack and effective area of the jack exceeds effective area of the manifold recess so that force from the jack exceeds force from the manifold recess so that extension of the jack moves the shoe radially inwards to contact the sealing track.

7. A rotary seal as claimed in claim 6 in which:
 i. the bridge member has an inner face, ii. a plurality of hydraulic jacks are provided in the shoe recess and extend between the shoe and the inner face of the bridge member, iii. the hydraulic fluid conduit connects the jack to supply pressurized hydraulic fluid substantially simultaneously to all jacks, so that the jacks extend generally uniformly to urge the shoe substantially radially onto the shaft.

8. A rotary seal as claimed in claim 6 in which:

i. the shaft sleeve has an annular manifold extending circumferentially around and within the sleeve, the annular manifold being connected to the fluid output of the shaft, ii. the input bores are radial bores extending radially outwards in the shaft sleeve and have inner and outer ends, the inner ends of the bores communicating with the annular manifold, iii. the valves are fitted adjacent the outer ends of the input bores and are disposed radially relative to the shaft.

9. A rotary seal as claimed in claim 3 in which:

i. the shaft sleeve has an annular manifold extending circumferentially around and within the sleeve, the annular manifold being connected to the fluid output of the shaft, ii. the input bores are radial bores extending radially outwards in the shaft sleeve and have inner and outer ends, the inner ends of the bores communicating with the annular manifold, iii. the valves are fitted adjacent the outer ends of the input bores and are disposed radially relative to the shaft.

10. A rotary seal as claimed in claim 8 in which:

i. the shaft sleeve has an annular manifold extending circumferentially around and within the sleeve, the annular manifold being connected to the fluid output of the shaft, ii. the input bores have outer and inner portions, the outer portions being radial bores disposed within the diametrical plane of the outer ends of the input bores, the inner portions being axial bores extending lengthwise through the sleeve, the inner portions communicating with the annular manifold, iii. the valves are fitted within the inner portions of the bores and are disposed axially relative to the shaft.

11. A rotary seal as claimed in claim 3 further including:

g. an opposed manifold member generally similar to the first manifold member, the opposed member being disposed on a side of the shaft sleeve diametrically opposite to the first member and being mounted for movement relative to the stationary member, which movement is opposite to movement of the first manifold member, h. an opposed extensible means generally similar to the first extensible means, the opposed extensible means cooperating with the opposed manifold member so that extension of both extensible means urges both manifold members on to the sleeve, forces from each manifold member being generally equal and thus being balanced about the shaft.

12. A rotary seal as claimed in claim 3 in which:

i. the shaft sleeve has spaced ends, ii. the housing has spaced end walls within spaced diametrical planes of the shaft generally coincident with spaced ends of the shaft sleeve, iii. radial bearings are provided between the end walls and spaced ends of the shaft so as to journal the stationary member on the shaft.

13. A rotary seal as claimed in claim 1 further including:

i. resilient means cooperating with the manifold member to apply a force to the manifold member in opposition to the extensible means, the resilient means tending to move the lips of the peripheral walls from out of contact with the sealing track of the shaft sleeve, so that when the extensible means is activated and extends and fluid enters the manifold recess the resilient means is retracted to permit the lips of the peripheral walls to contact the sealing track to effect sealing, and when the extensible means is de-activated, the resilient means extends and moves the lips of the peripheral walls out of contact with the sealing track, thus reducing wear.

14. A rotary seal as claimed in claim 1 in which:

i. the fluid output from the shaft sleeve includes a delivery bore in the sleeve, the delivery bore having an inner end communicating with the annular manifold and an outer end communicating with an axial conduit, the rotary seal further includes:

j. a return bore in the sleeve extending from the delivery bore to the interior of the housing, k. a scavenge valve in the delivery bore, the valve having a valve body having a valve orifice, the valve body being slidable within the delivery bore so as to open and close the return bore, so that when the valve orifice is opened by fluid pressure in the input bores and the annular manifold, the return bore is closed by the body and fluid passes the scavenge valve into the axial conduit; and when the valve orifice is closed by fluid pressure from scavenged fluid returning to the sleeve from the axial conduit, the valve body moves so as to open the return bore to pass scavenged fluid to the interior of the housing.

15. A rotary seal as claimed in claim 1 in which:

i. the sealing track is a portion of an annular face of the shaft sleeve disposed in a diametrical plane of the shaft, the annular face being defined in part by inner and outer circumferential edges, ii. the manifold member is mounted for generally axial movement relative to the shaft, and the peripheral walls defining the manifold recess of the manifold member include:

iii. a pair of radially spaced circumferential walls disposed between the inner and outer circumferential edges of the annular face, the circumferential walls having coplanar lips disposed within the diametrical plane of the shaft, iv. a pair of spaced connecting walls extending between and intersecting the circumferential walls, the connecting walls having lips generally coplanar with the lips of the circumferential walls, so that the lips of the peripheral walls are complementary to the sealing track of the shaft sleeve to produce an effective seal when the lips are forced generally axially against the sealing track.

16. A rotary seal as claimed in claim 15 in which a thrust bearing is provided between the shaft sleeve and the housing so as to resist axial thrust from the manifold member and to journal the housing on the shaft sleeve.

17. A rotary seal as claimed in claim 15 in which:
  i. the sleeve has a circumferential rim extending therearound, the rim having two annular faces disposed in spaced parallel diametrical planes, each face having a respective sealing track, the rotary seal further including:
  l. an opposed manifold member generally similar to the first manifold member, the opposed member being disposed on the same side of the sleeve relative to the shaft as the first member and displaced axially relative to the first member, the second manifold member cooperating with a second sealing track and being mounted for axial movement relative to the shaft, which movement is opposite to movement of the first manifold member,
  m. an opposed extensible means generally similar to the first extensible means, the opposed means co-operating with the opposed manifold member so that extension of both extensible means urges both manifold members onto the sleeve, forces from each manifold member being generally equal and thus being balanced about the shaft.

* * * * *